United States Patent
Nakazawa et al.

(10) Patent No.: US 6,843,810 B2
(45) Date of Patent: Jan. 18, 2005

(54) ELECTRIC DOUBLE LAYER CAPACITOR AND METHOD FOR PREPARING THE SAME

(75) Inventors: Yutaka Nakazawa, Miyagi (JP); Ryuichi Kasahara, Miyagi (JP); Koji Sakata, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 10/749,562

(22) Filed: Jan. 2, 2004

(65) Prior Publication Data

US 2004/0141280 A1 Jul. 22, 2004

Related U.S. Application Data

(62) Division of application No. 10/271,986, filed on Oct. 17, 2002, now Pat. No. 6,751,084.

(30) Foreign Application Priority Data

Oct. 19, 2001 (JP) ........................................ 2001-322737

(51) Int. Cl.[7] .............................. H01G 9/00; B05D 5/12
(52) U.S. Cl. ........................... 29/25.03; 427/79; 427/80
(58) Field of Search ............................ 29/25.01–25.03; 427/79, 80

(56) References Cited

U.S. PATENT DOCUMENTS

| | | | |
|---|---|---|---|
| 5,072,335 A | 12/1991 | Kurabayashi et al. | |
| 5,786,981 A | 7/1998 | Aoki et al. | |
| 6,324,049 B1 | 11/2001 | Inagawa et al. | |
| 6,356,433 B1 * | 3/2002 | Shi et al. ................. | 361/502 |
| 6,377,441 B1 | 4/2002 | Ohya et al. | |
| 6,625,007 B2 * | 9/2003 | Sakata et al. ............... | 361/502 |
| 6,741,450 B2 * | 5/2004 | Nakazawa et al. .......... | 361/502 |

FOREIGN PATENT DOCUMENTS

| | | |
|---|---|---|
| JP | 10-004033 | 1/1998 |
| JP | 10-004034 | 1/1998 |
| WO | WO 98/40435 | 9/1998 |
| WO | WO 99/02585 | 1/1999 |

* cited by examiner

*Primary Examiner*—Ha Tran Nguyen
(74) *Attorney, Agent, or Firm*—Sughrue Mion, PLLC

(57) ABSTRACT

An electric double layer capacitor is disclosed which is capable of preventing transmission of an electrolytic solution vaporized in a basic cell through current collectors and capable of improving a yield. A method for preparing the electric double layer capacitor is also disclosed. The electric double layer capacitor comprises a basic cell prepared by the steps of: applying a current collector onto a surface of a substrate; disposing an electrically insulating gasket element on the surface the substrate in such a manner that the current collector laterally abuts on the gasket element to define a concavity; placing a polarizable electrode impregnated with an electrolytic solution on the surface of the current collector; oppositely disposing two intermediate products prepared through the foregoing steps on a separator in such a manner that the gasket elements abut on surfaces of a peripheral portion of the separator; fusion-bonding the gasket elements together to laterally cover the separator with the resulting unified gasket; and removing the substrates from the current collectors and the gasket. The substrate has a vapor transmission rate of a predetermined one or lower with respect to the electrolytic solution vaporized at a temperature of the fusion-bonding.

5 Claims, 4 Drawing Sheets

(a)

(b)

(a)

(b)

(c)

(d)

(e)

(f)

(a)

(b)

(c)

(d)

(e)

(f)

(g)

(a)

(b)

(c)

(d)

(e)

(f)

(g)

ELECTRIC DOUBLE LAYER CAPACITOR AND METHOD FOR PREPARING THE SAME

This is a divisional of Application No. 10/271,986 filed Oct. 17, 2002 now U.S. Pat. No. 6,751,084; the disclosure of which is incorporated herein by reference.

BACKGROUND OF THE INVENTION

1. Field of the Invention

The present invention relates to an electric double layer capacitor and a method for preparing the same.

2. Description of the Prior Art

Heretofore, electric double layer capacitors have been put to practical use as capacitors which enable obtaining high capacities of farad(F)-order without involving chemical reaction and which endure charge and discharge of heavy currents and charge-and-discharge cycles.

In recent years, with a view to making good use of electric double layer capacitors, studies on new applications thereof as an auxiliary power supply of an electronic appliance such as a cellular phone. Concomitantly therewith, further miniaturization and capacity increase of electric double layer capacitors have been attempted.

As shown in FIG. 4, a conventional electric double layer capacitor comprises a basic cell 10 including a porous separator 11 in the form of a sheet; a pair of current collectors in the form of a sheet disposed oppositely relative to the separator 11; a pair of polarizable electrodes 13, 13 having a plate-like form and disposed between the separator and the current collectors; and gasket 14 which is laterally contiguous to the separator 11 and the polarizable electrodes 13, 13 and held between the current collectors 12, 12. The basic cell 10 is sealed with an electrolytic solution contained therein.

In most cases, the gasket 14 is prepared from two gasket elements 141, 141 for manufactural reason.

In the next place, a method for preparing a conventional electric double layer capacitor will be described with reference to FIG. 4.

FIGS. 4(a) to 4(g) are sectional views schematically showing a part of a method for preparing a conventional electric double layer capacitor.

As shown in FIG. 4(a), a current collector 12 in the form of sheet is provided and, as shown in FIG. 4(b), it is cut down to size.

As the current collector 12, an electrically conductive film is generally employed which comprises an electrical insulating resin and electrically conductive particles. With respect to material and method for the production thereof, there maybe employed conventional techniques, for example, disclosed in Japanese Unexamined Patent Publication Nos. 1998-4033 and 1998-4034 by Nagaki et al.

Further, as disclosed in U.S. Pat. No. 6,377,441 by Ohya et al., a laminate prepared by laminating a plurality of current collectors 12 may be employed.

Moreover, as materials suitable for the current collector, those disclosed in PCT/JP98/01021 and PCT/JP98/03073 may be employed.

Then, as shown in FIG. 4(c), a gasket element 141 in the form of a frame, i.e., a gasket element 141 having an opening is disposed on the surface of the current collector 12. Since the gasket element 141 is disposed on a peripheral portion of the surface of the current collector 12, a portion of the surface of the current collector 12 within the opening remains uncovered.

Then, as shown in FIG. 4(d), a polarizable electrode 13 is provided on the uncovered portion of the surface of the current collector 12 and, as shown in FIG. 4(e), a separator 11 is so disposed on the gasket element 141 as to cover the opening of the gasket element 141.

Thereafter, as shown in FIG. 4(f), another product as shown in FIG. 4(d) is disposed on the separator 11 in such a manner that inner portions of the gasket elements 141, 141 of the two products as shown in FIG. 4(d) oppositely abut on the separator 11, and the gasket elements 141, 141 are subjected to thermo-compression bonding from both sides via the current collectors 12, 12.

The gasket elements 141, 141 are deformed so that outer portions of the gasket elements 141, 141 vertically extend all around the separator 11, and the gasket elements 141, 141 are fusion-bonded together into a gasket 14. As a result, the separator 11 is laterally covered with the gasket 14 all around to thereby obtain an electric double layer capacitor as shown in FIG. 4(g).

In recent years, miniaturization of electronic parts has been advanced. In particular, the advents of small-sized electric double layer capacitors having high capacities and the like have strongly been desired as described above.

However, according to the conventional method for preparing an electric double layer capacitor, if it has been intended to prepare an electric double layer capacitor as a small-sized capacitor with a high capacitor, there have been limitations in size and in mechanical strength which are attributed to the preparation method.

Specifically, a current collector used in a conventional electric double layer capacitor has been a butyl rubber containing a carbon powder in most cases. With respect also to a gasket, a butyl rubber has been used because of its affinity with the current collector.

If a current collector and a gasket which are made of a butyl rubber or the like have been miniaturized in order to advance miniaturization of electric double layer capacitors, there has been a problem in poor mechanical strength in the fusion-bonding step or the like. This has created a limitation on miniaturization of electric double layer capacitors.

Further, if each of members including a current collector has been reduced to too thin a film with an intention to miniaturize electric double layer capacitors, transmission of electrolytic solution vaporized in the step of thermo-compression bonding has been liable to occur. As a result, there have been undesirable variations in equivalent series resistance (ESR). This leads to a lowered yield of electric double layer capacitors as products.

SUMMARY OF THE INVENTION

It is, therefore, an object of the present invention to solve the above-described problems caused concomitantly with miniaturization of an electric double layer capacitor and to provide an electric double layer capacitor, which is adaptable to miniaturization and which has a high capacity and stable characteristics such as ESR, and a method for preparing the same.

According to an embodiment of the present invention, an electric double layer capacitor has such a structure that current collectors as constituents of a basic cell laterally abut on a gasket. Accordingly, the current collectors do not undergo excess deformations by pressures which are exerted on the basic cell in the thickness direction thereof in the course of the preparation thereof, and hence leakage of the electrolytic solution is less likely to occur.

According to another embodiment of the present invention, an electric double layer capacitor is prepared by the preparation method including steps of forming a structure comprising a current collector and a gasket element which are applied on the same substrate. Accordingly, occurrence of defects in a step of fusion-bonding in the preparation of the electric double layer capacitor is suppressed even if the electric double layer capacitor is miniaturized, and hence high productivity of the electric double layer capacitor is realized.

DETAILED DESCRIPTION OF THE PREFERRED EMBODIMENTS

In the following, an embodiment of the electric double layer capacitor and a basic cell thereof according to the present invention will be described with reference to the drawings.

Figure 1:
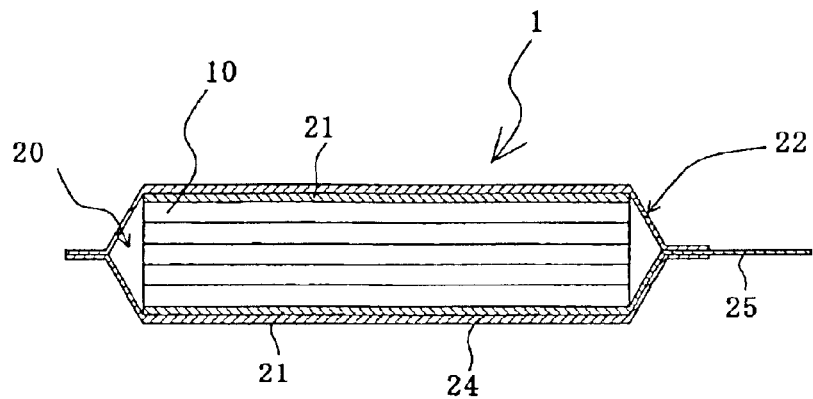
FIGS. 1(a) and 1(b) are sectional views schematically showing structures of an embodiment of the electric double layer capacitor and a basic cell thereof according to the present invention, respectively.
Figure 1:
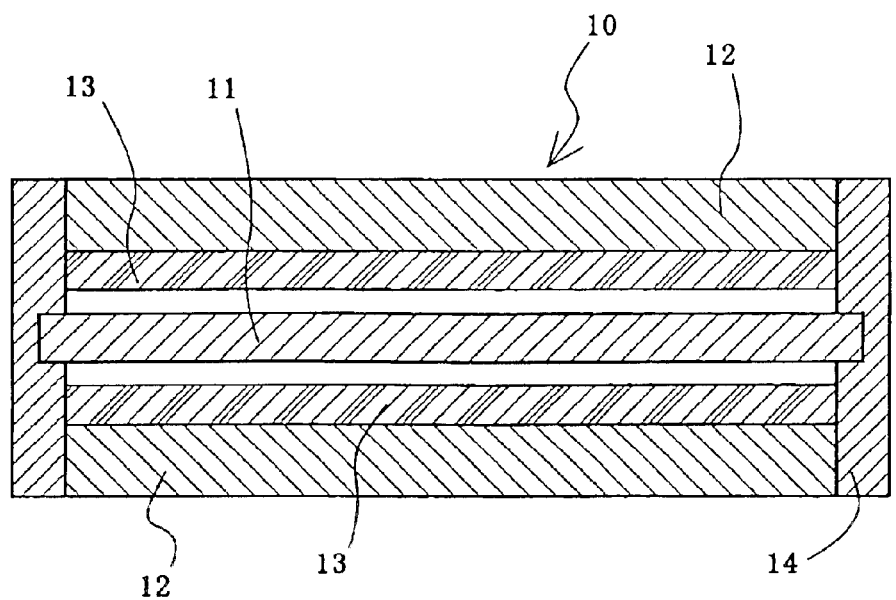

FIGS. 1(a) and 1(b) are sectional views schematically showing structures of an embodiment of the electric double layer capacitor and a basic cell thereof according to the present invention, respectively.

As shown in FIG. 1(a), the electric double layer capacitor according to the present invention comprises at least one basic cell 10. By way of illustration, the embodiment comprising a cell structure 20 prepared by laminating 5 basic cells will be specifically described. On each of the outer surfaces of the outermost current collectors 12, 12 of the cell structure an electrode plate 21 provided with a lead terminal is attached. The cell structure 20 provided with the electrode plates 21, 21 is packaged in an outer packaging 22 with end portions of the lead terminals out. In general, the packaging is carried out under reduced pressure.

The electrode plate 21 provided with a lead terminal is made of copper and has its surfaces plated with solder. The electrode plate 21 comprises an electrode plate 24 having a tetragonal plate-like form and a lead terminal 25 having a ribbon-like form and extending from the electrode plate 24. The electrode plate bodies 24, 24 are bonded to the outer surfaces of the outermost current collectors 12, 12 of the cell structure 20 in terms of the thickness direction of the cell structure 20 with an electrically conductive adhesive or the like, respectively.

The outer packaging 22 is made of a laminated film prepared by laminating aluminum and an electrical insulating resin in such a manner that the resin constitutes the surfaces of the laminated film.

As shown in FIG. 1(b), the basic cell 10 comprises a separator 11 having a substantially planar form; a pair of current collectors 12, 12 having a plate-like form and disposed oppositely relative to the separator 11 and in parallel with the separator 11; a pair of polarizable electrodes 13, 13 having a plate-like form and disposed between the separator 11 and the current collectors 12, 12; and a gasket 14 in the form of a frame disposed in such a manner that gasket 14 is laterally contiguous to the separator 11 and the current collectors 12, 12 to accommodate the polarizable electrodes in a pair of closed vacancies defined by the separator 11, the current collectors 12, 12 and the gasket 14. One of the polarizable electrodes 13, 13 is thereby accommodated in one of the closed vacancies and the other polarizable electrode 13 in the other closed vacancy, and each of the vacancies contains an electrolytic solution.

In the electric double layer capacitor comprising at least one basic cell 10 having the above-described structure, the gasket 14 mainly sustains forces pressed (on the basic cell 10) in the direction of the thickness of the basic cell 10 in the course of the preparation of the electric double layer capacitor, for example, in the bonding of the basic cell 10 with the electrode plate 24 and in the bonding of the basic cell 10 with another basic cell 10. Accordingly, since the current collectors 12, 12 do not undergo excess deformation such as distortion in the preparation of the electric double layer capacitor, breakage of the basic cell 10 and leakage of the electrolytic solution contained therein are not liable to occur.

When the outer surface of each of current collectors 12, 12 of the basic cell 10 is substantially coplanar with the nearer end surface of the gasket 14 or apart from the plane including the nearer end surface of the gasket 14 at a distance of about 20 µm or smaller, the above-described effects are remarkable. In other words, both end surfaces of the gasket 14 protrudes from the adjacent surfaces of current collectors 12, 12 of the basic cell 10 through 20 µm at most.

If the distance is larger than about 20 µm, voids are likely to formed at the interface between basic cells 10, 10 in the preparation of the the electric double layer capacitor, for example, in the lamination of the basic cell 10 with another basic cell 10.

Further, it is preferred that each of the thickness of the current collectors 12, 12 of the basic cell 10 having the above-described structure be from about 15 µm to about 100 µm. When size reduction of a capacitor is advanced, constituents thereof are reduced in size concomitantly therewith. In such a situation, if the current collector 12 has a thickness of larger than about 100 µm, electrical resistance of (a material of) the current collector 12 itself is high. Consequently, basic electrical characteristics of the capacitor is impaired. On the other hand, if the current collector 12 has a thickness of smaller than about 15 µm, mechanical strength thereof is considerably lowered. This leads to a decrease in yield.

Further, it is preferred that quotient obtained by dividing the value resulting from subtraction of the thickness of the polarizable electrode 13 from the distance between the current corrector 12 and the separator 11 by the thickness of the separator 11 be in a range of about 0.2 to about 0.6. With respect to the capacitor having such a structural feature, ESR is low, and leakage of the electrolytic solution is less likely to occur.

If the value of the quotient is smaller than about 0.2, bond between gasket elements (which are unified by fusion-bonding to form the gasket 14 as described hereinbelow) and bonds between the gasket 14 and the current collectors 12, 12, which bonds are made by fusion-bonding in the preparation of the basic cell 10, are likely to be insufficient. This leads to a decrease in yield in the preparation of the basic cell 10. On the other hand, if the value of the quotient is larger than about 0.6, ESR is high. This results in lowering of the quality of the basic cell 10.

The gasket 14 is preferably made of a resin having a transparency of such a degree that the contents of the closed vacancies can be seen through the gasket to thereby allow visual check of electrolytic solution leakage or the like. This enables easily detecting basic cells 10 which have become defective in the course of the preparation thereof, contributing to improvement of quality of the basic cell 10.

More preferably, the gasket 14 is made of a colorless and transparent polyolefin film. A polyolefin film satisfies specifications which the gasket is required to have in chemical properties, thermal properties and mechanical strength. Further, a polyolefin film is easily and stably provided as a colorless and transparent material, thereby leading to stabilized preparation.

Still more preferably, the gasket 14 is made of a colorless and transparent polyolefin film made of an ionomer. An ionomer is a resin containing metal ions located at cross-linked positions, and the gasket 14 made of such a resin has a specific gravity of about 0.93 to about 0.97. Accordingly, the gasket element 141 made of an ionomer on the substrate 100 is easier to handle in the preparation of the basic cell 10 as compared with a conventional gasket element made of a polyethylene which mostly has a specific gravity of about 0.91 to about 0.93. This leads to lowered percent defective in the fusion-bonding step.

In the next place, an embodiment of the method for preparing an electric double layer capacitor according to the present invention will be described below with reference to the drawings.

FIGS. 2(a) to 2(f) are sectional views schematically showing an embodiment of the method for preparing an electric double layer capacitor according to the present invention.

Figure 2:
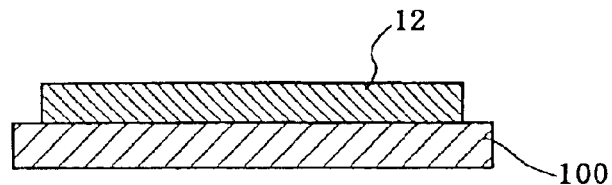
FIGS. 2(a) to 2(f) are sectional views schematically showing a characteristic part of an embodiment of the method for preparing an electric double layer capacitor according to the present invention.
Figure 2:
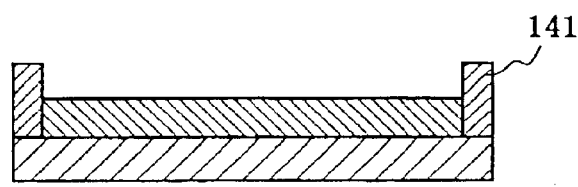
Figure 2:
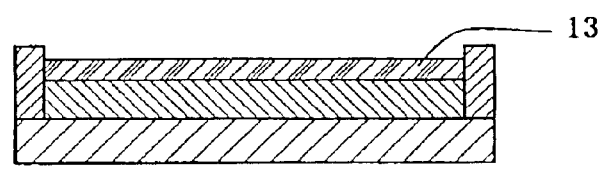
Figure 2:
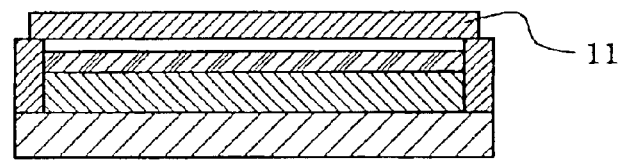
Figure 2:
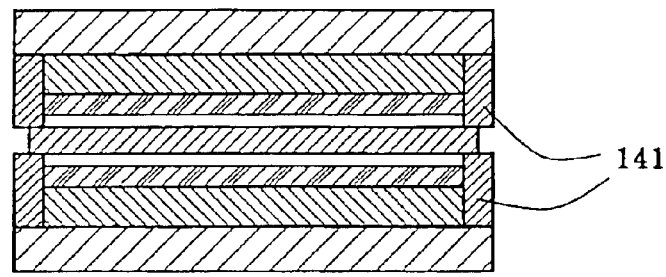
Figure 2:
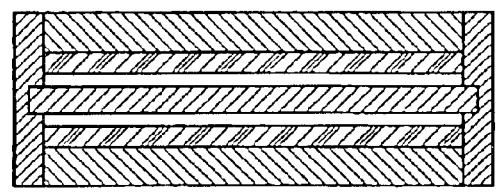

As shown in FIG. 2(a), first, a current collector 12 having a plate-like form is applyed onto a surface of a substrate 100 having a surface area larger than that of the current collector 12, if desired, with a release agent or the like interposed therebetween. The resulting uncovered marginal portion of the substrate 100 formed around the current collector 12 when viewed in plan has such a form that a gasket element 141 which will be described below is disposed on the uncovered marginal portion.

It is preferred that the current collector 12 be an electrically conductive film made of a styrene-ethylene-butylene-styrene copolymer resin containing a carbon powder.

Then, as shown in FIG. 2(b), the gasket element 141 in the form of a frame having an opening for accommodating the current collector 12 is disposed on the uncovered marginal portion of the substrate 100 in such a manner that the current collector 12 laterally abut on the gasket element 141 to define a concavity. The gasket element 141 and the current collector 12 are fusion-bonded. The fusion-bonding is carried out, for example, at a temperature of 120° C. for 10 minutes.

The gasket element 141, two of which will be fusion-bonded to form a gasket 14 as described later, is preferably made of a resin having a transparency of such a degree that the contents of the closed vacancies can be seen through the gasket to thereby allow visual check of electrolytic solution leakage or the like. This enables easily detecting basic cells 10 which have become defective in the course of the preparation thereof, contributing to improvement of quality of the basic cell 10.

More preferably, the gasket element 141 is made of a colorless and transparent polyolefin film. A polyolefin film satisfies specifications, which the gasket is required to have in chemical properties, thermal properties and mechanical strength. Further, a polyolefin film is easily and stably provided as a colorless and transparent material, thereby leading to stabilized preparation.

Still more preferably, the gasket element 141 is made of a colorless and transparent polyolefin film made of an ionomer. An ionomer is a resin containing metal ions located at cross-linked positions, and the gasket element 141 made of such a resin has a specific gravity of about 0.93 to about 0.97. Accordingly, the gasket element 141 made of an ionomer (resin) on the substrate 100 is easier to handle in the preparation of the basic cell 10 as compared with a conventional gasket element made of a polyethylene which mostly has a specific gravity of about 0.91 to about 0.93. This leads to lowered percent defective in the fusion-bonding step.

Then, as shown in FIG. 2(c), a polarizable electrode 13 impregnated with an electrolytic solution is placed in the concavity defined by the current collector 12 and the gasket element 141. The polarizable electrode 13 has such a thickness that the surface of the polarizable electrode 13 placed on the current collector 12 is located below the upper end surface of the gasket element 141.

Then, as shown in FIG. 2(d), a separator 11 having a substantially planar form is mounted on the gasket element 141 in such a manner that the gasket element 141 abuts on a surface of a peripheral portion of the separator 11 and that an uncovered portion of the upper end surface of the gasket element 141 is formed around the separator 11 when viewed in plan.

Each of the gasket elements 141 preferably has such a thickness that quotient obtained by dividing the value resulting from subtraction of the thickness of the polarizable electrode 13 from the distance between the current collector 12 and the separator 11 by the thickness of the separator 11 is in a range of about 0.2 to about 0.6.

By virtue of such a structural feature, equivalent series resistance (ESR) stands low, and leakage of the electrolytic solution is less likely to occur.

If the value of the quotient is smaller than about 0.2, bond between the gasket elements 141, 141 and bond between the gasket element 141 and the current collectors 12, which bonds are made by fusion-bonding in the preparation of the basic cell 10, are likely to be insufficient. This leads to a decrease in yield in the preparation of the basic cell 10.

On the other hand, if the value of the quotient is larger than about 0.6, ESR is high. This results in lowering of the quality of the basic cell 10.

Subsequently, as shown in FIG. 2(e), another intermediate product prepared through the steps of FIG. 2(a) to FIG. 2(c) is mounted on the separator 11 in such a manner that the two intermediate products are oppositely disposed on the separator 11. In this case also, the counterpart intermediate product is disposed in such a manner that the gasket element 141 abuts on a peripheral portion of the separator 11 and that an uncovered portion of the end surface of the gasket element 141 which end surface is distal to the substrate 100 is formed around the separator 11 when viewed in plan.

In other words, the two intermediate products prepared through the steps of FIG. 2(a) to FIG. 2(c) are so disposed as to hold the separator 11 therebetween with the polarizable electrodes 13 oppositely disposed relative to the separator 11.

Then, the gasket elements 141, 141 of the two intermediate products are fusion-bonded together into a gasket 14 to prepare a basic cell 10 with the substrates 100, 100, and the substrates 100, 100 are removed therefrom to obtain the basic cell 10 as shown in FIG. 2(f).

Subsequently, an electric double layer capacitor is prepared as follows, although the process is not shown in FIGS. A cell structure comprising a laminate of a plurality of basic cells 10 is prepared. On each of the outer surfaces of the outermost current correctors 12, 12 of the cell structure 20 in terms of the thickness direction of the cell structure 20, an electrode plate 24 of a lead terminal/electrode plate assembly 21 is disposed. Heating is performed at a predetermined temperature (for example, 85° C.) for a predetermined period of time (for example, 2 hours) to thereby unify the electrode plates each provided with a lead terminal with the cell structure 20.

Thereafter, the lead terminal/electrode plate assemblies 21, 21 and the cell structure 20 which have been unified is packaged in an outer packaging with end portions of the lead terminals out by fusion-bonding a peripheral protion of the outer packaging in an atmosphere having reduced pressure to seal the outer packaging. An electric double layer capacitor 1 is thereby completed.

In this embodiment, the cell structure comprising a laminated basic cells is described. However, the cell structure may comprise a single basic cell having its surfaces each provided with an electrode plate 24.

The above-described method is innovative in that pressures are not directly applied to the members constituting the basic cell 10 but applied to the members via the substrates 100, 100 in the preparation of the basic cell 10. When the basic cell 10 is miniaturized, mechanical strengths of the members of the basic cell 10 which include the current collectors 12, 12 are lowered concomitantly with the miniaturization. However, since the substrates 100, 100 serve as reinforcing members for the current collectors 12, 12 and the gasket elements 141, 141 to support these members, the current collectors 12, 12 and the gasket elements 141, 141 are less likely to undergo separation therebetween or deformation thereof by pressures applied thereto in the preparation of the basic cell 10. This leads to increased productivity of the basic cell 10.

Further, by the use of the substrates 100, 100, a phenomenon of transmission of vaporized electrolytic solution through the current collectors 12, 12 is suppressed which is caused in the fusion-bonding (step). When the members are reduced in size, the phenomenon becomes considerable. However, this problem can be solved by using a material which is resistant to transmission of vaporized electrolytic solution therethrough for the substrates 100, 100.

The thickness of the substrate 100 depends on materials. However, when PET is used, a thickness of about 100 µm is sufficient.

Accordingly, a material for the substrate 100 preferably has such physical properties that the substrate 100 has a vapor transmission rate of about 10 mg/m$^2$/24 h or lower measured in accordance with JIS Z 0206 test method when diluted sulfuric acid is used as the electrolyte solution. In other words, amount of the transmitted vaporized electrolytic solution is about 10 mg or smaller in 24 hours per m$^2$. By using the material having such properties for the substrate 100 in the above-described method, the basic cells 10 show a small range of variation in performance, particularly in ESR even if the basic cells 10 are miniaturized.

Of materials which satisfy suitability as the reinforcing member and the level of the transmission rate, it is particularly preferred to use a polyethylene terephthalate (PET) film as the substrate 100. A PET film not only satisfies the suitability and the level because of its excellent mechanical strength and a low vapor transmission rate but also shows a small dimensional change by thermal stress. Accordingly, precision and yield in the preparation are maintained at high levels even if the basic cell 10 is miniaturized. With respect to the thickness thereof, a thickness in a range of about 15 µm to about 200 µm is preferable and about 100 µm is more preferable.

If the substrate 100 has a small thickness and a vapor transmission rate of higher than about 10 mg/m$^2$/24 h, there is a high possibility that leakage of the electrolytic solution become non-negligible to impair basic characteristics of the capacitor. the substrate 100 with a thickness higher than about 200 µm is less appropriate for the preparation of a basic cell 10.

It is preferred that prior to the step of removing the substrates in the above-described method, the following steps of heating and cooling be carried out because occurrence of defects in the step of removing is inhibited.

When the current collectors 12, 12 having a glass transition temperature higher than that of the substrates 100, 100 are used, the steps of heating and cooling are preferably carried out prior to the step of removing the substrates in such a manner that the structure into which the substrates 100, 100, the current collectors 12, 12, the gasket 14 and the separator 11 are united, i.e., the structure resulting from the step of fusion-bonding the gasket elements is placed in an environment having a temperature which is equal to the glass transition temperature of the substrates 100, 100 or higher and which is lower than the glass transition temperature of the current collectors 12, 12, and subsequently, the resultant is placed in an environment having a temperature which is room temperature or lower.

By employing these steps, adhesion between the current collectors 12, 12 and the substrates 100, 100 is weakened due to the difference between the glass transition temperature of the current collectors 12, 12 and that of the substrates 100, 100, and accordingly, the substrates 100, 100 are easily removed from the current collectors 12, 12.

In the following, another embodiment of the method for preparing an electric double layer capacitor according to the present invention will be described with reference to the drawings.

FIGS. 3(a) to 3(g) are sectional views schematically showing another embodiment of the method for preparing an electric double layer capacitor according to the present invention.

This embodiment of the present invention is mainly employed in so-called "multiple-piece preparation" in which a sheet of film for current collectors and a substrate in the form of a sheet of film are used each of which sheets has a sufficient size for this purpose, and a plurality of products are prepared therefrom.

Figure 3:
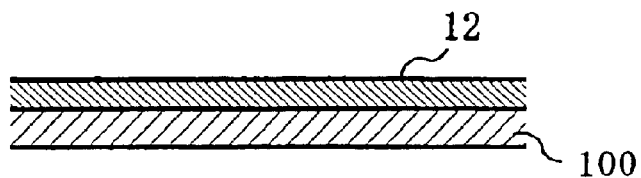
FIGS. 3(a) to 3(g) are sectional views schematically showing a characteristic part of another embodiment of the method for preparing an electric double layer capacitor according to the present invention.
Figure 3:
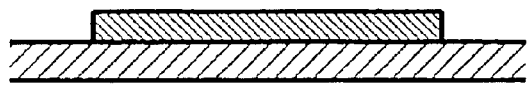
Figure 3:
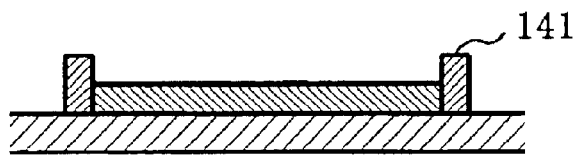
Figure 3:
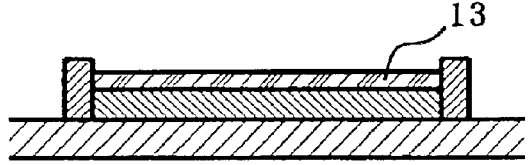
Figure 3:
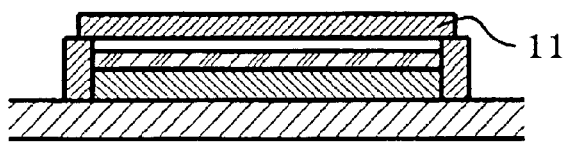
Figure 3:
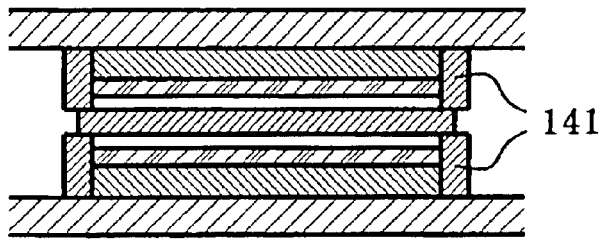
Figure 3:
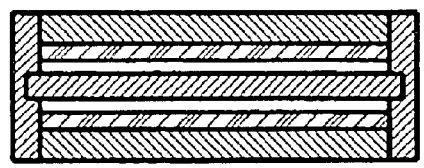
Figure 4:
FIGS. 4(a) to 4(g) are sectional views schematically showing a part of a method for preparing a conventional electric double layer capacitor.
Figure 4:
Figure 4:
Figure 4:
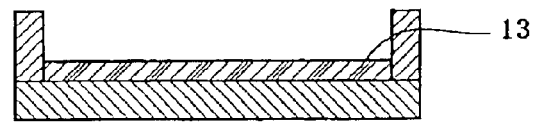
Figure 4:
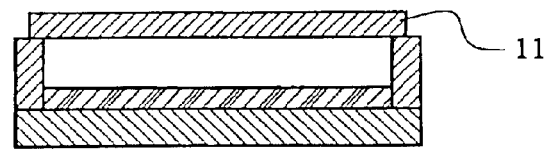
Figure 4:
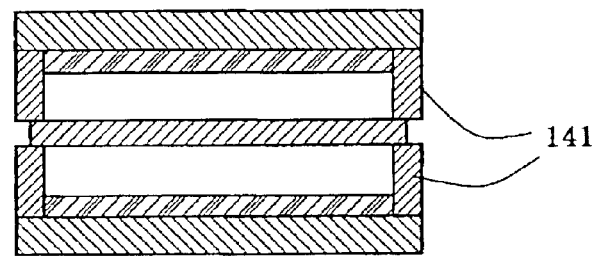
Figure 4:
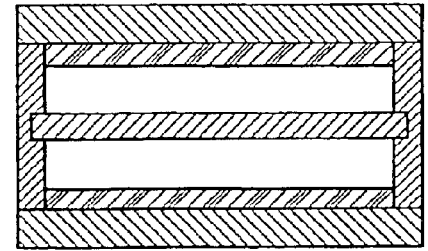

As shown in FIG. 3(a), first, the sheet of film for current collectors 12 having a plate-like form is applied onto the surface of the substrate 100 in the form of a sheet of film, if desired, with a release agent or the like interposed therebetween.

In this connection, it is preferred that the current collector 12 be an electrically conductive film made of a styrene-ethylene-butylene-styrene copolymer resin containing a carbon powder.

Then, as shown in FIG. 3(b), cutting only the sheet of film for current collectors 12 which has been applied onto the substrate 100, i.e., so-called "halfway cutting" is conducted to form current collectors 12 and an uncovered portion of the surface of the substrate 100 around the current collectors 12 when viewed in plan so that after the cutting, the current collectors 12 are conformable with openings of gasket elements 141 and the uncovered portion between adjacent current collectors 12 has such a width as to permit gasket elements 141 for the adjacent current correctors 12 to be disposed without interfering with each other. This arrangement enables the current collectors 12 to be en bloc subjected to the following steps.

Thereafter, as shown in FIG. 3(c), with respect to each of the current collectors 12, a gasket element 141 in the form of a frame having an opening for accommodating the current collector 12 is disposed on the uncovered portion of the substrate 100 around the current collector 12 in such a manner that the current collector 12 laterally abut on the gasket element 141 to define a concavity. The gasket element 141 and the current collector 12 are fusion-bonded. Conditions for the fusion-bonding is such that the fusion-bonding is carried out, for example, at a temperature of 120° C. for 10 minutes.

After the fusion-bonding, the gasket element 141 has an opening for accommodating the current collector 12 and is disposed on the surface of the substrate 100 in such a manner that the current collector 12 is fitted in the opening.

The gasket element 141, two of which will be fusion-bonded to form a gasket 14 as described later, is preferably made of a resin having a transparency of such a degree that the contents of the closed vacancies can be seen through the gasket to thereby allow visual check of electrolytic solution leakage or the like. This enables easily detecting basic cells 10 which have become defective in the course of the preparation thereof, contributing to improvement of quality of the basic cell 10.

More preferably, the gasket element 141 is made of a colorless and transparent polyolefin film. A polyolefin film satisfies specifications which the gasket is required to have in chemical properties, thermal properties and mechanical strength. Further, a polyolefin film is easily and stably provided as a colorless and transparent material, thereby Still more preferably, the gasket element 141 is made of a colorless and transparent polyolefin film made of an ionomer. An ionomer is a resin containing metal ions located at cross-linked positions, and the gasket element 141 made of such a resin has a specific gravity of about 0.93 to about 0.97. Accordingly, the gasket element 141 made of an ionomer on the substrate 100 is easier to handle in the preparation of the basic cell 10 as compared with a conventional gasket element made of a polyethylene which mostly has a specific gravity of about 0.91 to about 0.93. This leads to lowered percent defective in the fusion-bonding step.

Then, as shown in FIG. 3(d), a polarizable electrode 13 impregnated with an electrolytic solution is placed in each of the concavitis defined by the current collectors 12 and the gasket elements 141. The polarizable electrode 13 has such a thickness that the (upper) surface of the polarizable electrode 13 placed on the current collector 12 is located below the upper end surface of the gasket element 141. The resulting product is referred to as an intermediate product.

Then, as shown in FIG. 3(e), a separator 11 having a substantially planar form is mounted on each of the gasket elements 141 at a predetermined distance from the polarizable electrode 13 in such a manner that the gasket element 141 abuts on a surface of a peripheral portion of the separator and that an uncovered portion of the upper end surface of the gasket element 141 is formed around the separator 11 when viewed in plan.

Each of the gasket elements 141 preferably has such a thickness that quotient obtained by dividing the value resulting from subtraction of the thickness of the polarizable electrode 13 from the distance between the current collector 12 and the separator 11 by the thickness of the separator 11 is in a range of about 0.2 to about 0.6.

By virtue of such a structural feature, ESR stands low, and leakage of the electrolytic solution is less likely to occur.

If the value of the quotient is smaller than about 0.2, bond between the gasket elements 141, 141 and bond between the gasket element 141 and the current collectors 12, which bonds are made by fusion-bonding in the preparation of the basic cell 10, are likely to be insufficient. This leads to a decrease in yield in the preparation of the basic cell 10.

On the other hand, if the value of the quotient is larger than about 0.6, ESR is high. This results in lowering of the quality of the basic cell 10.

Further, as shown in FIG. 3(f), in one mode of this step, another intermediate product as a counterpart intermediate product prepared through the steps of FIG. 3(a) to FIG. 3(d) and subsequent separation into individual intermediate products is mounted on the separator 11 in such a manner that the gasket element 141 of the counterpart intermediate product abuts on the other surface of the peripheral portion of the separator 11 and that an uncovered portion of the end surface of the gasket element 141 which end surface is distal to the individual substrate 100a is formed around the separator 11 when viewed in plan.

In other words, the two intermediate products prepared through the steps of FIG. 3(a) to FIG. 3(d) and the subsequent separation into individual intermediate products are so disposed as to hold the separator 11 therebetween with the polarizable electrodes 13 oppositely disposed relative to the separator 11.

In another mode of this step, another product prepared through the steps of FIG. 3(a) to FIG. 3(d) which is not separated into individual intermediate products, i.e., a substrate 100 with intermediate products formed thereon is used as a counterpart substrate 100 with counterpart intermediate products formed thereon (hereinafter referred to as counterpart combination). The counterpart combination is mounted on the separators 11 in such a manner that each intermediate product on which one of the separators 11 is disposed and its counterpart intermediate product are oppositely disposed on the separator 11 and that each of the counterpart intermediate products is disposed on the separator 11 in the same manner as the counterpart intermediate product in the one mode of this step. In this connection, the counterpart intermediate products are formed on the counterpart substrate 100 in such an arrangement that each intermediate product on which one of the separators 11 is disposed is paired with one of the counterpart intermediate products when the counterpart combination is mounted on the separators 11. Each of the paired intermediate products with the separator 11 interposed therebetween in this mode is subjected to the following steps in the same manner as the two intermediate products with the separator interposed therebetween in the one mode of this step. This mode facilitates to en bloc subject the paired intermediate products with the separator interposed therebetween to the next step.

Then, the gasket elements 141, 141 of the two intermediate products are fusion-bonded together into a gasket 14 to prepare a basic cell 10 with the substrate 100 and the individual substrate 100a, and the substrates 100, 10a are removed therefrom to obtain the basic cell 10 as shown in FIG. 3(g). It is to be noted that a plurality of current collectors on the substrate in the step of FIG. 3(b), the resulting products on the substrate from each of the steps of FIGS. 3(c) and (e) and the resulting products on (between) the substrates from the step of FIG. 3(f) may be separately or en bloc subjected to the next steps, respectively.

Subsequently, an electric double layer capacitor is prepared as follows, although the process is not shown in FIGS. A cell structure comprising a laminate of a plurality of basic cells 10 is prepared. On each of the outer surfaces of the outermost current correctors 12, 12 of the cell structure 20 in terms of the thickness direction of the cell structure 20, an electrode plate 24 of a lead terminal/electrode plate assembly 21 is disposed. Heating is performed at a predetermined temperature (for example, 85° C.) for a predetermined period of time (for example, 2 hours) to thereby unify the electrode plates each provided with a lead terminal with the cell structure 20.

Thereafter, the electrodes each provided with a lead terminal and the cell structure 20 which have been unified is packaged in an outer packaging with end portions of the lead terminals out by fusion-bonding a peripheral portion of the outer packaging in an atmosphere having reduced pressure to seal the outer packaging. An electric double layer capacitor 1 is thereby completed.

In this embodiment, the cell structure comprising a laminated basic cells is described. However, the cell structure may comprise a single basic call having its surface each provided with an electrode plate 24.

The above-described method is innovative in that pressures are not directly applied to the members constituting the basic cell 10 but applied to the members via the substrates 100, 100a in the preparation of the basic cell 10. When the basic cell 10 is miniaturized, mechanical strengths of the members of the basic cell 10 which include the current collectors 12, 12 are lowered concomitantly with the miniaturization. However, since the substrates 100, 100a serve as reinforcing members for the current collectors 12, 12 and the gasket elements 141, 141 to support these members, the current collectors 12, 12 and the gasket elements 141, 141 are less likely to undergo separation therebetween or deformation thereof by pressures applied thereto in the preparation of the basic cell 10. This leads to increased productivity of the basic cell 10.

Another important effect of the present invention obtained by the use of the substrates 100, 100a is reside in that a phenomenon of transmission of vaporized electrolytic solution through the current collectors 12, 12 is suppressed which is caused in the fusion-bonding (step). When the members are reduced in size, the phenomenon becomes considerable. However, this problem can be solved by using a material which is resistant to transmission of vaporized electrolytic solution therethrough for the substrates 100, 100a.

Accordingly, a material for the substrates 100, 100a preferably has such physical properties that the substrates 100, 100a have a vapor transmission rate of about 10 mg/m$^2$/24 h or lower measured in accordance with JIS Z 0206 test method when diluted sulfuric acid is used as the electrolyte solution. In other words, amount of the transmitted vaporized electrolytic solution is about 10 mg or smaller in 24 hours per m2. By using the material having such properties for the substrates 100, 100a in the above-described method, the basic cells 10 show a small range of variation in performance, particularly in ESR even if the basic cells 10 are miniaturized.

Of materials which satisfy suitability as the reinforcing member and the level of the transmission rate, it is particularly preferred to use a polyethylene terephthalate (PET) film as the substrate 100, 100a. A PET film not only satisfies the suitability and the level because of its excellent mechanical strength and a low vapor transmission rate but also shows a small dimensional change by thermal stress. Accordingly, precision and yield in the preparation are maintained at high levels even if the basic cell 10 is miniaturized. With respect to the thickness thereof, a thickness of about 100 μm is sufficient.

If the substrates 100, 100a has a small thickness and a vapor transmission rate of higher than about 10 mg/m$^2$/24 h, there is a high possibility that leakage of the electrolytic solution become non-negligible to impair basic characteristics of the capacitor.

It is preferred that prior to the step of removing the substrates 100, 100a in the above-described method, the following steps of heating and cooling be carried out. This is because occurrence of defects in the step of removing is inhibited.

When the current collectors 12, 12 have a glass transition temperature higher than that of the substrates 100, 100a are used, the steps of heating and cooling are preferably carried out prior to the step of removing the substrates in such a manner that the structure into which the substrates 100, 100a, the current collectors 12, 12, the gasket 14 and the separator 11 are united, i.e., the structure resulting from the step of fusion-bonding the gasket elements is placed in an environment having a temperature which is equal to the glass transition temperature of the substrates 100, 100a or higher and which is lower than the glass transition temperature of the current collectors 12, 12, and subsequently, the resultant is placed in an environment having a temperature which is room temperature or lower.

By employing these steps, adhesion between the current collectors 12, 12 and the substrates 100, 100a is weakened due to the difference between the glass transition temparature of the current collectors 12, 12 and that of the substrates 100, 100a, and accordingly, the substrates 100, 100a are easily removed from the current collectors 12, 12.

EXAMPLES

The description of the following specific Examples is given by way of illustration for more clear understanding of the present invention. In Examples, preferred embodiments of the present invention are described. It is, however, to be understood that the present invention is by no means restricted to these specific Examples.

Example 1

A current collector in the form of a thin film was bonded to a surface of a substrate in the form of a thin film which had a surface area larger than that of the current collector with a release agent interposed therebetween in such a manner that an uncovered marginal portion of the surface of the substrate was formed around the current collector (when viewed in plan) and that the uncovered marginal portion had such a shape as to allow a gasket element which will be described below to be disposed thereon. The current collector in the form of a thin film was made of a styrene-ethylene-butylene-styrene copolymer resin as disclosed in PCT/JP98/

01021 and had a size of 3 cm×3 cm and a thickness of 80 μm. The substrate in the form of a thin film had a thickness of 100 μm and was made of a PET having a vapor transmission rate of 10 mg/m²/24 h or lower (amount of transmitted vapor is 10 mg or smaller in 24 hours per m2) measured in accordance with JIS Z 0208 test method with respect to diluted sulfuric acid.

Thereafter, a gasket element in the form of a frame having an opening for accommodating the current collector was disposed on the uncovered portion of the substrate in such a manner that the current collector laterally abutted on the gasket element to define a concavity. The gasket element in the form of a frame had a height of 140 μm and was made of a colorless and transparent electrical insulating polyolefinic ionomer film having a specific gravity of about 0.93 to about 0.97. The gasket element and the current collector were fusion-bonded. The fusion-bonding was performed at a temperature of 120° C. for 10 minutes. Then, a polarizable electrode impregnated with an aqueous solution of sulfuric acid as an electrolytic solution was placed on the surface of the current collector. (The resulting product is referred to as an intermediate product.) The polarizable electrode was made of a sintered product prepared by sintering an activated carbon powder and had a size of 3 cm×3 cm and a thickness of 45 μm.

Then, a separator having a substantially planar form was disposed on the gasket element in such a manner that the gasket element abutted on a peripheral portion of the separator and that an uncovered portion of the upper end of the gasket element was formed around the separator (when viewed in plan). The separator was made of a polypropylene and has a size of 3.5 cm×3.5 cm and a thickness of 25 μm.

In this Example, the height of the gasket element was 140 μm. Accordingly, the value of quotient obtained by dividing the value resulting from subtraction of the thickness of the polarizable electrode from the distance between the current collector and the separator by the thickness of the separator was 0.6.

Further, another intermediate product as a counterpart intermediate product was mounted on the separator in such a manner that the two intermediate products were oppositely disposed on the separator. In this case also, the counterpart intermediate product was disposed on the separator in such a manner that the gasket element abutted on a peripheral portion of the separator and that an uncovered portion of the end surface of the gasket element which end surface was distal to the substrate was formed around the separator (when viewed in plan). In other words, the two intermediate products were so disposed on the separator as to hold the separator therebetween with the polarizable electrodes oppositely disposed relative to the separator.

Then, the two gasket elements were fusion-bonded together into a gasket at a temperature of 120° C. for 10 minutes to unite the intermediate products and the separator. A basic cell with the substrates was thereby prepared.

Subsequently, the basic cell with the substrates was allowed to stand in an environment having a temperature of 120° C. for 10 minutes. Then, the basic cell with the substrates was allowed to stand in an environment having a temperature of 25° C. for 1 hour.

Thereafter, two substrates were removed from the basic cell to obtain the basic cell.

A cell structure was prepared by laminating 5 basic cells obtained as described above. On each of the outer surfaces of the two outermost current collectors of the cell structure in terms of the thickness direction of the cell structure, an electrode plate of a lead terminal/electrode plate assembly was disposed, and the electrode plates each provided with a lead terminal and the cell structure were united by heating at 85° C. for 2 hours to obtain an electric double layer capacitor. With respect to the electric double layer capacitor obtained as described above, ESR was 22 m Ω, and percent defective attributed to leakage of the electrolytic solution during the preparation of the electric double layer capacitor was 1.2%.

Example 2

A sheet of thin film for current collectors was bonded to a surface of a substrate in the form of a sheet of thin film which had a surface area substantially the same as that of the sheet of thin film for current collectors with a release agent interposed therebetween. The sheet of thin film for current collectors was made of a styrene-ethylene-butylene-styrene copolymer resin as disclosed in PCT/JP98/01021 and had a thickness of 80 μm. The substrate in the form of a sheet of thin film had a thickness of 100 μm and was made of a PET having a vapor transmission rate of 10 mg/m²/24 h or lower (amount of transmitted vapor is 10 mg or smaller in 24 hours per m2) measured in accordance with JIS Z 0208 test method with respect to diluted sulfuric acid.

Then, cutting only the sheet of film for current collectors which had been applied onto the substrate, i.e., so-called "halfway cutting" was conducted to form a plurality of current collectors having a size of 3 cm×3 cm in such an arrangement that adjacent current collectors were apart form each other at a distance of 3 cm, and as a result of the halfway cutting, an uncovered portion of the surface of the substrate was formed around the current collectors when viewed in plan. Thereafter, with respect to each of the current collectors, a gasket element in the form of a frame having an opening for accommodating a current collector was disposed on the uncovered portion of the substrate in such a manner that the current collector laterally abutted on the gasket element to define a concavity. The gasket element in the form of a frame had a height of 140 μm and was made of a colorless and transparent electrical insulating polyolefinic ionomer film having a specific gravity of about 0.93 to about 0.97. The gasket element and the current collector were fusion-bonded. The fusion-bonding was performed at a temperature of 120° C. for 10 minutes.

Then, with respect to each of the products resulting from the immediately proceeding step, a polarizable electrode impregnated with an aqueous solution of sulfuric acid as an electrolytic solution was placed on the surface of the current collector to prepare an intermediate product. The polarizable electrode was made of a sintered product prepared by sintering an activated carbon powder and has a size of 3 cm×3 cm and a thickness of 45 μm.

Then, with respect to each of the intermediate products, a separator having a substantially planar form is disposed on the gasket element in such a manner that the gasket element abuts on a peripheral portion of the separator and that an uncovered portion of the upper end of the gasket element was formed around the separator (when viewed in plan). The separator was made of a polypropylene and has a size of 3.5 cm×3.5 cm and a thickness of 25 μm.

In this Example, the height of the gasket element was 140 μm. Accordingly, the value of quotient obtained by dividing the value resulting from subtraction of the thickness of the polarizable electrode from the distance between the current collector and the separator by the thickness of the separator was 0.6.

Through the above-described steps, a plurality of the intermediate products on each of which one of the separators was disposed were provided on the substrate.

Separately, another substrate provided with a plurality of intermediate products as counterpart intermediate products was prepared. This was mounted on the separators in such a manner that each pair of intermediate products disposed on the different substrates were oppositely disposed on the separator. Each pair of the intermediate products were so disposed on the separator as to hold the separator therebetween with the polarizable electrodes oppositely disposed relative to the separator.

Then, two gasket elements of each pair of the intermediate products were fusion-bonded together into a gasket at a temperature of 120° C. for 10 minutes to unite the intermediate products and the separator. A plurality of basic cells with the substrates were thereby prepared.

Subsequently, the basic cells with the substrates were allowed to stand in an environment having a temperature of 120° C. for 10 minutes. Then, the basic cells with the substrates were allowed to stand in an environment having a temperature of 25° C. for 1 hour.

Thereafter, two substrates were removed from the basic cells to obtain a plurality of the basic cells en bloc. A cell structure was prepared by laminating 5 basic cells obtained as described above. On each of the outer surfaces of the two outermost current collectors of the cell structure in terms of the thickness direction of the cell structure, an electrode plate 24 of a lead terminal/electrode plate assembly 21 was disposed, and the electrode plates each provided with a lead terminal and the cell structure were united by heating at 85° C. for 2 hours to obtain an electric double layer capacitor. With respect to the electric double layer capacitor obtained as described above, ESR was 22 mΩ, and percent defective attributed to leakage of the electrolytic solution during the preparation of the electric double layer capacitor was 1.2%.

Example 3

An electric double layer capacitor was prepared in the same manner as in Example 1 except that the gasket elements had a height of 130 μm. In this case, the value of quotient obtained by dividing the value resulting from subtraction of the thickness of the polarizable electrode from the distance between the current collector and the separator by the thickness of the separator was 0.2.

With respect to the electric double layer capacitor as obtained in this manner, ESR was 22 mΩ, and percent defective attributed to leakage of the electrolytic solution during the preparation of the electric double layer capacitor was 1.2%.

Example 4

An electric double layer capacitor was prepared in the same manner as in Example 1 except that the gasket elements had a height of 150 μm. In this case, the value of quotient obtained by dividing the value resulting from subtraction of the thickness of the polarizable electrode from the distance between the current collector and the separator by the thickness of the separator was 1.0.

With respect to the electric double layer capacitor as obtained in this manner, ESR was 49 mΩ, and percent defective attributed to leakage of the electrolytic solution during the preparation of the electric double layer capacitor was 0.3%.

Example 5

An electric double layer capacitor was prepared in the same manner as in Example 1 except that the gasket elements had a height of 160 μm. In this case, the value of quotient obtained by dividing the value resulting from subtraction of the thickness of the polarizable electrode from the distance between the current collector and the separator by the thickness of the separator was 1.4.

With respect to the electric double layer capacitor as obtained in this manner, ESR was 120 mΩ), and percent defective attributed to leakage of the electrolytic solution during the preparation of the electric double layer capacitor was 0.0%.

Example 6

An electric double layer capacitor was prepared in the same manner as in Example 1 except that the gasket elements had a height of 125 μm. In this case, the value of quotient obtained by dividing the value resulting from subtraction of the thickness of the polarizable electrode from the distance between the current collector and the separator by the thickness of the separator was 0.

With respect to the electric double layer capacitor as obtained in this manner, ESR was 19 mΩ, and percent defective attributed to leakage of the electrolytic solution during the preparation of the electric double layer capacitor was 8.2%.

Example 7

An electric double layer capacitor was prepared in the same manner as in Example 1 except that the current collectors had a thickness of 100 μm and the gasket elements had a height of 160 μm.

With respect to the electric double layer capacitor as obtained in this manner, ESR was 43 mΩ, and percent defective attributed to leakage of the electrolytic solution during the preparation of the electric double layer capacitor was 0.9%.

Example 8

An electric double layer capacitor was prepared in the same manner as in Example 1 except that the current collectors had a thickness of 15 μm and the gasket elements had a height of 75 μm.

With respect to the electric double layer capacitor as obtained in this manner, ESR was 17 mΩ, and percent defective attributed to leakage of the electrolytic solution during the preparation of the electric double layer capacitor was 10.1%.

Example 9

An electric double layer capacitor was prepared in the same manner as in Example 1 except that the substrates had a thickness of 20 μm. The substrates had a vapor transmission rate of higher than 10 mg/m$^2$/24 h measured in accordance with JIS Z 0208 test method.

With respect to the electric double layer capacitor as obtained in this manner, ESR was 22 mΩ, and percent defective attributed to leakage of the electrolytic solution during the preparation of the electric double layer capacitor was 11.5%.

Comparative Example 1

The same preparation method as in Example 1 was carried out up to the step of fusion-bonding the current collector and the gasket element which had been disposed on the substrate. Then, the substrate was removed. Subsequently, the same procedure as in Example 1 was resumed to prepare an electric double layer capacitor.

With respect to the electric double layer capacitor as obtained in this manner, ESR was 30 mΩ, and percent defective attributed to leakage of the electrolytic solution during the preparation of the electric double layer capacitor was 30.4%.

What is claimed is:

1. A method for preparing en electric double layer capacitor, said method comprising steps of:
  (A) applying a current collector having a plate-like form onto a surface of a substrate in such a manner that an uncovered portion of the substrate is formed around the current collector;
  (B) disposing a gasket element in the form of a frame having an opening for accommodating the current collector on the uncovered portion of the substrate in such a manner that the current collector laterally abuts on the gasket element to define a concavity;
  (C) placing a polarizable electrode impregnated with an electrolytic solution in the concavity defined by the current collector and the gasket element;
  (D) oppositely disposing two intermediate products prepared through the steps (A) to (C) on a separator having a substantially planar form in such a manner that the gasket elements abut on surfaces of a peripheral portion of the separator;
  (E) fusion-bonding the gasket elements together to laterally cover the separator with the resulting unified gasket to unite the two intermediate products and the separator; and
  (F) removing the substrates from the current collectors and the gasket.

2. A method for preparing an electric double layer capacitor according to claim 1, wherein the substrate has a vapor transmission rate of about 10 mg/m2/24 h or lower measured in accordance with JIS Z 0208 test method when provided that diluted sulfuric acid is used as an electrolytic solution.

3. A method for preparing an electric double layer capacitor according to claim 1, wherein the substrate is a polyethylene terephthalate film.

4. A method for preparing an electric double layer capacitor according to claim 1, wherein the current collectors have a glass transition temperature higher than that of the substrate, said method further comprises between the steps (E) and (F), steps of:
  (a) placing the product resulting from the step (E) in an environment having a temperature which is equal to the glass transition temperature of the substrate or higher and which is lower than the glass transition temperature of the current collector; and subsequently
  (b) placing the resultant in an environment having a temperature which is room temperature or lower.

5. A method for preparing an electric double layer capacitor according to claim 1, wherein a plurality of current collectors are applied onto the substrate in the step (A) and wherein the current collectors on the substrate in the step (A), the resulting products on the substrate from each of the steps (B) and (C) and the resulting products on between the substrates from the step (D) are en bloc subjected to the next steps (B) to (E), respectively.

* * * * *